United States Patent [19]

Hoberman

[11] Patent Number: 4,862,419

[45] Date of Patent: Aug. 29, 1989

[54] HIGH SPEED POINTER BASED FIRST-IN-FIRST-OUT MEMORY

[75] Inventor: Barry A. Hoberman, Mountain View, Calif.

[73] Assignee: Monolithic Memories, Inc., Santa Clara, Calif.

[21] Appl. No.: 908,059

[22] Filed: Sep. 16, 1986

Related U.S. Application Data

[63] Continuation-in-part of Ser. No. 551,735, Nov. 10, 1983, Pat. No. 4,642,797.

[51] Int. Cl.$^4$ .............................................. G11C 13/00
[52] U.S. Cl. ...................................... 365/221; 365/75; 377/64
[58] Field of Search .............................. 365/73, 77-78, 365/219, 220, 221, 239; 364/900 MS File; 377/64, 66, 67, 77

[56] References Cited

U.S. PATENT DOCUMENTS

| | | | |
|---|---|---|---|
| 3,976,842 | 8/1976 | Hoyt | 381/34 |
| 4,151,609 | 4/1979 | Moss | 365/221 |
| 4,152,781 | 5/1979 | Aichelman, Jr. | 365/77 |
| 4,374,428 | 2/1983 | Barns | 364/900 |

FOREIGN PATENT DOCUMENTS 5320825  2/1978  Japan ................................ 365/220

Primary Examiner—Terrell W. Fears

[57] ABSTRACT

A FIFO memory system organizes a memory with N word storage locations into M pointer-based random access memories, each containing N/M storage locations. A sequence of data words is written into and read out of the M RAMs in a cyclical fashion. An M fold increase in write rate is obtained by an input control logic which causes all M RAMs to be in a different stage of the shift-in cycle at the same time. Similarly, an M fold increase in read rate is obtained by an output control logic which causes all M RAMs to be simultaneously in a different stage of the shift-out cycle. The output signals of the RAMs being read are multiplexed to generate the original sequence.

5 Claims, 19 Drawing Sheets

DATA 0 TO 4 IS UNINVERTED, 5 TO 9 IS INVERTED

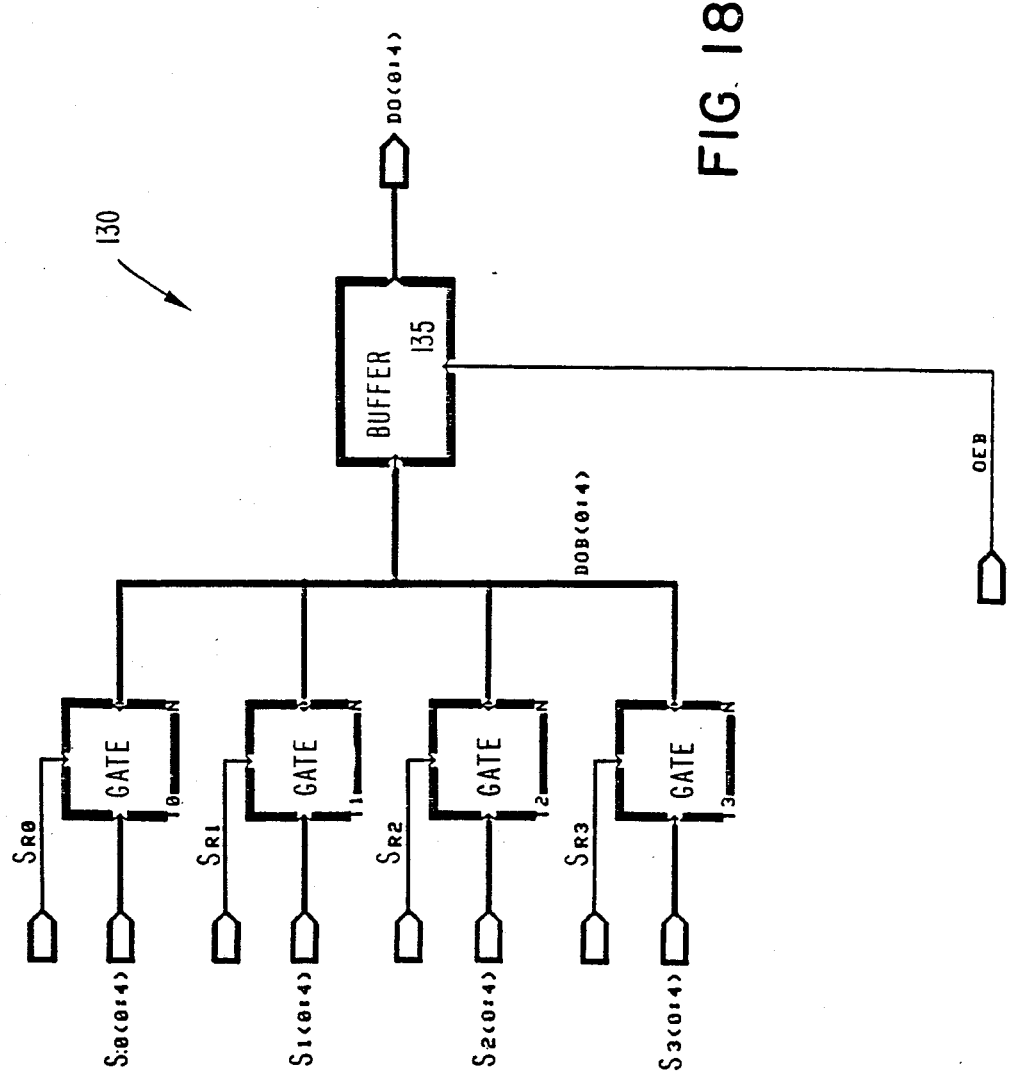

HIGH SPEED POINTER BASED FIRST-IN-FIRST-OUT MEMORY

CROSS-REFERENCE TO RELATED APPLICATION

This application is a continuation-in-part of copending U.S. patent application No. 551,735 filed Nov. 10, 1983 now U.S. patent 4,642,797, which is incorporated herein by reference.

BACKGROUND OF THE INVENTION

1. Field of the Invention

This invention is related to a first-in-first-out (FIFO) memory system and in particular to a high speed FIFO memory containing a plurality of pointer-based random access memories (RAMs).

2. Description of the Prior Art

FIG. 1 shows the block diagram of a FIFO memory system which is drawn broadly enough to encompass prior art FIFO memories as well as the FIFO memory system of the present invention.

This generic FIFO memory buffer 10 includes a FIFO memory 4 which allows the simultaneous writing of data through its input port 1 and the reading out of data through its output port 7, respectively. In addition a first-in-first-out protocol is imposed upon the data which is first written into and then read out of the memory.

Input control logic 2 provides information to the user describing whether the FIFO memory 4 is filled to capacity and also provides information to the user describing whether the FIFO memory is ready to receive additional data. Output control logic 5 provides information to the user describing whether the memory is empty and whether data is available to be read out of the memory. When the FIFO memory 4 is filled to capacity, the input control logic 2 prohibits additional data input to the FIFO memory 4. Similarly, when the FIFO memory 4 is empty, the output control logic 5 prohibits attempted removal of data from the FIFO memory 4.

The data input buffer 3 electrically buffers the input signals which appear at input port 1 and generates the voltage levels of the data input signals required by the FIFO memory 4 for proper operation.

The data output buffer 6 electrically buffers the signals representing a data word read-out of the FIFO memory 4 and presents the buffered signals to external circuitry (not shown).

In contrast, a standard shift register allows only synchronous reading and writing at the input and output ports of the FIFO memory system 10, and when proper internal operating conditions are met operates completely asynchronously, including the reading and writing of data at different speeds.

Prior art FIFO memory systems can be divided into two classes which depend on their internal organization: fall-through systems and pointer-based systems.

The internal organization of a fall-through FIFO memory system 19 is depicted in FIG. 2. The fall-through FIFO memory 20 includes a stack 21 of data registers, numbered consecutively 21-0 to 21-(N−1), a stack 23 of control registers 23-0, . . . , 23-(N−1), and word propagation logic 27.

The operation of this system is analogous to that of a bucket brigade. Each control register 23-0 through 23-(N−1) associated with data registers 21-0 through 21-(N−1), respectively, contains a logical zero if its associated data register is empty and stores a logical one if its associated data register contains information. Consider first the case of an empty memory. For an empty memory, control registers 23-0 through 23-(N−1) will each store a logical zero. When a data word is shifted into fall-through FIFO memory 20 from the input port 28, it is latched into data register 21-0, and control register 23-0 is set to a logical one. When this shifting-in cycle is complete, word propagation logic 27 detects the condition that control register 23-1 stores a logical zero (i.e., that data register 21-1 is empty) and that control register 23-0 stores a logical one (i.e., that data register 21-0 is full), initiates a transfer of data from data register 21-0 to data register 21-1 and resets control register 23-0 to a logical zero so that it indicates that data register 21-0 is empty and sets control register 23-1 to logical one so that it indicates that data register 21-1 is full. In like fashion, the data word will be transferred through each data register of the fall-through FIFO memory consecutively until it reaches data register 21-(N−1). The next word written into the memory will fall-through to data register 21-(N−2); in this fashion, data words will continue to fall-through and stop in data registers consecutively closer to the data input buffer 22 until the fall-through FIFO memory 20 is full. A word may be shifted into data register 21-0 whenever control register 23-0 stores a logical zero. Each word in the memory falls from a given data register to the next lower data register in the stack when the word propagation logic 27 detects that the given control register stores a logical one and the next lower control register stores a logical zero, so that more than one word may be in the fall-through process at a given time. When a data word is shifted out of the memory, the shifting out procedure resets control register 23-(N−1) from a logical one to a logical zero. In the typical fall-through fashion, if control register 23-(N−2) contains a logical one the data word in data register 21-(N−2) will propagate forward to data register 21-(N−1) and appear at the output port 29. All remaining words in the FIFO will successively advance one data register toward the data output buffer 24. Data input is permitted by the input control logic 25 if and only if control register 23-0 at the top of stack 23 contains a logical zero, indicating that data register 21-0 is empty. Similarly, data output is permitted by the output control logic 26 if and only if control register 23-(N−1) at the bottom of stack 23 contains a logical one, indicating that data register 21-(N−1) is full.

One example of a prior art fall-through memory system is contained in U.S. Pat. No. 4,151,609 entitled "FIRST IN FIRST OUT (FIFO) MEMORY", issued to Moss in 1979, which is assigned to Monolithic Memories, Inc., the assignee of this application, and which is incorporated herein by reference.

There are three features of the operation of a fall-through FIFO memory system which are particularly important for comparison with the operation of a pointer-based FIFO memory system. First, there is a significant delay (fall-through time) associated with the propagation of the first word entered into data register 21-0 of an empty fall-through FIFO memory to the last data register 21-(N−1). This delay also exists for the backward propagation of an empty register position from the output data register position (data register 21-(N−1)) back to the input register position (data register 21-0) when a data word is shifted out of a full fall-through FIFO memory. This delay is a direct result of the fact that each data word must pass through every register in the fall-through FIFO memory before it is read out.

Second, there is a serious limitation on shift-in (and shift-out) cycle time that is imposed by the "fall through" architecture: that is, the theoretical maximum data transfer rate at either the input port 28 or the output port 29 is only 50% of the apparent shifting frequency of the fall-through register stack. The precise reasoning behind this limit is intricate, but can be summarized by noting that the shifting of data into data register 21-0 of two consecutive data words at high speeds requires the following sequence of operations:

1. The first data word is shifted into data register 21-0 of the fall-through stack 21 from the input port 28 via data input buffer 22.
2. The first data word is shifted from the data register 21-0 to the data register 21-1.
3. The second data word is shifted from the data input port into the data register 21-0 as soon as but not prior to the completion of the shift operation described above in step number 2. In particular, there is a waiting period required while a data word is being transferred from data register 21-0 to data register 21-1 that prevents the use of the data input port until the transfer is complete.

The third important feature of fall-through FIFO organization is the constraint that data always moves from the data input port 28 into the same physical memory location, passes through the same sequence of physical memory positions, and moves from the same physical memory location through the data output buffer 24 to the output port 29.

The internal organization of a typical pointer-based FIFO memory system is depicted in FIG. 3. The pointer-based FIFO memory 30 comprises a dual port random access memory (RAM) 31, which is used for data storage, and control logic 32. Control logic 32 creates the FIFO protocols and controls the interface between the input port 35 and the RAM 31 and also controls the interface between the RAM 31 and the output port 36.

The control logic 32 includes two counters, input address counter 32-1 and output address counter 32-2, an address magnitude comparator 32-3, and miscellaneous control logic 32-4. Input address counter 32-1 generates the address of the storage location where the next data input word is to be stored and output address counter 32-2 generates the address of the storage location from which the next data output word is to be taken. Address magnitude comparator 32-3 compares the two counter addresses currently stored in the input and output address counters 31-1 and 32-2 and identifies if RAM 31 is either full or empty, respectively. Miscellaneous control logic 32-4 generates the internal RAM control signals and provides signals to the input control logic 33 and to the output control logic 37 which indicate the status of the RAM 31 and the control logic 32.

For descriptive purposes the addresses generated by the input and output address counters may be denominated 0, 1, 2, ... N−1, where N is the number of storage locations in the RAM 31 available for storing data words. Each address corresponds to a unique word storage location in the RAM 31.

The operation of the pointer based FIFO memory 30 is straightforward. When initialized the FIFO RAM 31 is empty and both the input and output address counters 32-1 and 32-2, respectively "point" to address 0. (A counter is said to "point" to the address k if k is the number in the counter.) Also when initialized, write ring pointer 31a and read ring pointer 31b "point" to the word storage location corresponding to address 0. (A ring pointer is said to "point" to a given storage location by providing a first selected signal to the given word storage location and the complement of the first selected signal to the remaining word storage locations). When the first word W(0) is loaded into the FIFO RAM 31 from input port 35 via data input buffer 34, it is loaded into RAM 31 at the word storage location having address 0.

In general, the input address counter 32-1 points to address k and write ring counter 31a points to the corresponding word storage location whose address is k (mod N) where k is the number of data words previously stored (k=0,1,2, ... ), and k (mod N) is the integral remainder when k is divided by N. In other words, the input data words W(0), W(1), ... , W(k), ... are stored cyclically in the RAM 31, with data word W(k) being stored in the storage location whose address is k (mod N) for k=0, 1, .... The comparator 32-3 senses when the input address counter points to an address whose storage location is full and then data entry is prohibited by the control logic 32.

In general, the output address counter 32-2 points to address j and read ring counter 31b points to the corresponding word storage location whose address is j (mod N) where j is the number of data words previously read out of the RAM, where j=0,1,2, .... Thus, the data output words are also read out cyclically. Again read-out is prohibited by the control logic 32 when the comparator 32-3 senses that the output address counter points to an address whose storage location is empty.

In view of the above formulas it is easy to see that the addresses on the input and output counters are equal if and only if the FIFO RAM 31 is either empty or full. For if the addresses are equal, then k=j (mod N). Under the constraints imposed above, either k=j in which case the number of data words previously stored equals the number of data words previously read out, i.e., the RAM is empty, or k=(j+N), in which case the number of data words previously stored exceeds the number of data words previously read out by N, the number of word storage locations in the RAM 31, i.e., the RAM 31 is full.

Conversely, if RAM 31 is empty, the number of data words previously stored equals the number of words previously read out, i.e. k=j so k=j (mod N); and if RAM 31 is full, the number of data words previously stored exceeds the number of data words previously read out by N, i.e., k=(j+N), so again k=j (mod N). Thus if RAM 31 is empty or full, the addresses k (mod N) and j (mod N) in input address counter 32-1 and output address counter 32-2, respectively, are equal.

The magnitude comparator identifies whether the RAM is empty or full by determining whether k=j(mod N), and signals the miscellaneous control logic to either allow or prohibit data entry at the input port 35 or allow or prohibit data removals at the output port 36.

One description of a prior art pointer-based FIFO memory system is contained in Column 1, lines 47–68 and Column 2, lines 1–58 of U.S. Pat. No. 4,374,428 entitled "EXPANDABLE FIFO SYSTEM", issued to Barnes, Feb. 15, 1983, which is hereby incorporated by reference.

Barnes improves upon this prior art system by providing an expandable number N of individual FIFO devices arranged to form a ring of identical FIFO devices connected in an identical manner where each device comprises a memory having N storage locations and pointing means which directs the writing of words into successive storage locations until read out of the FIFO system. In the Barnes expandable FIFO system the FIFO devices in the ring are filled sequentially, i.e., the first FIFO device in the ring is filled first and when it is full, words are written into the second FIFO device in the ring, and so on, until all of the FIFO devices in the ring are full.

There are significant differences between the operation of a pointer-based FIFO memory system and a fall through FIFO memory system. First, there is no fall-through time associated with a pointer-based memory that is akin to that of a fall-through type. There is a delay from data input to available data output, but it is short relative to the fall-through time of a fall-through memory and is caused by a small number of gate delays in the I/O control circuit and the RAM access cycle time and is not related to the fall-through phenomenon.

Second, the limitation on shift-in and shift-out cycle time in a pointer-based FIFO memory is imposed by a different sequence of events than in a fall-through FIFO memory. With each data shift operation, the pertinent counter must increment, the magnitude comparator must settle, i.e., determine whether or not a full or empty state exists, and the port control signals must be adjusted before the next shift operation can occur.

Lastly, in a pointer-based FIFO memory it is apparent that data can be input or output from any physical location in the data memory, due to the fact that RAM structure is used as the core of the device.

In the aforementioned U.S. Patent 4,642,797, filed Nov. 10, 1983, which is incorporated herein by reference, there is disclosed a FIFO memory system which organizes a memory with N word storage locations into M fall-through columns each of length N/M. The present invention organizes a memory with N storage locations and provides M pointer-based RAMs each having N/M storage locations.

SUMMARY

In accordance with this invention, a FIFO memory system operates to organize a memory with N word storage locations into M pointer-based random access memories (RAMs) each having N/M word storage locations. An input control logic including a pointer writes incoming data words cyclically into the M pointer-based RAMs. Output control logic including a pointer reads previously-stored data words cyclically out of the M pointer-based RAMs.

The rate at which words may be written into or read out of the system is greatly increased compared to prior art pointer-based FIFO storage memories having N storage locations for two reasons. First, and most importantly, the switching time of the input and the output control logic, i.e., the time required by the input control or the output control logic to perform its logical operations is short, relative to the shift-in and shift-out cycle time of each pointer-based RAM in the system, so that more than one pointer-based RAM may be in the shift-in (or shift-out) cycle at the same time. In one preferred embodiment all M RAMS are in different stages of the shift-in (or shift-out) cycle at the same time, thereby leading to an approximate M fold improvement in the rate at which words can be written or read. Second, each of the M pointer-based FIFOs in the system has only N/M storage locations. Therefore the shift-in and shift-out cycle time of each FIFO in the systems tends to be shorter than for a FIFO having N storage locations.

BRIEF DESCRIPTION OF THE DRAWINGS

FIG. 18 is a block diagram of the multiplexer buffer shown in FIG. 17.

DETAILED DESCRIPTION

Figure 4:
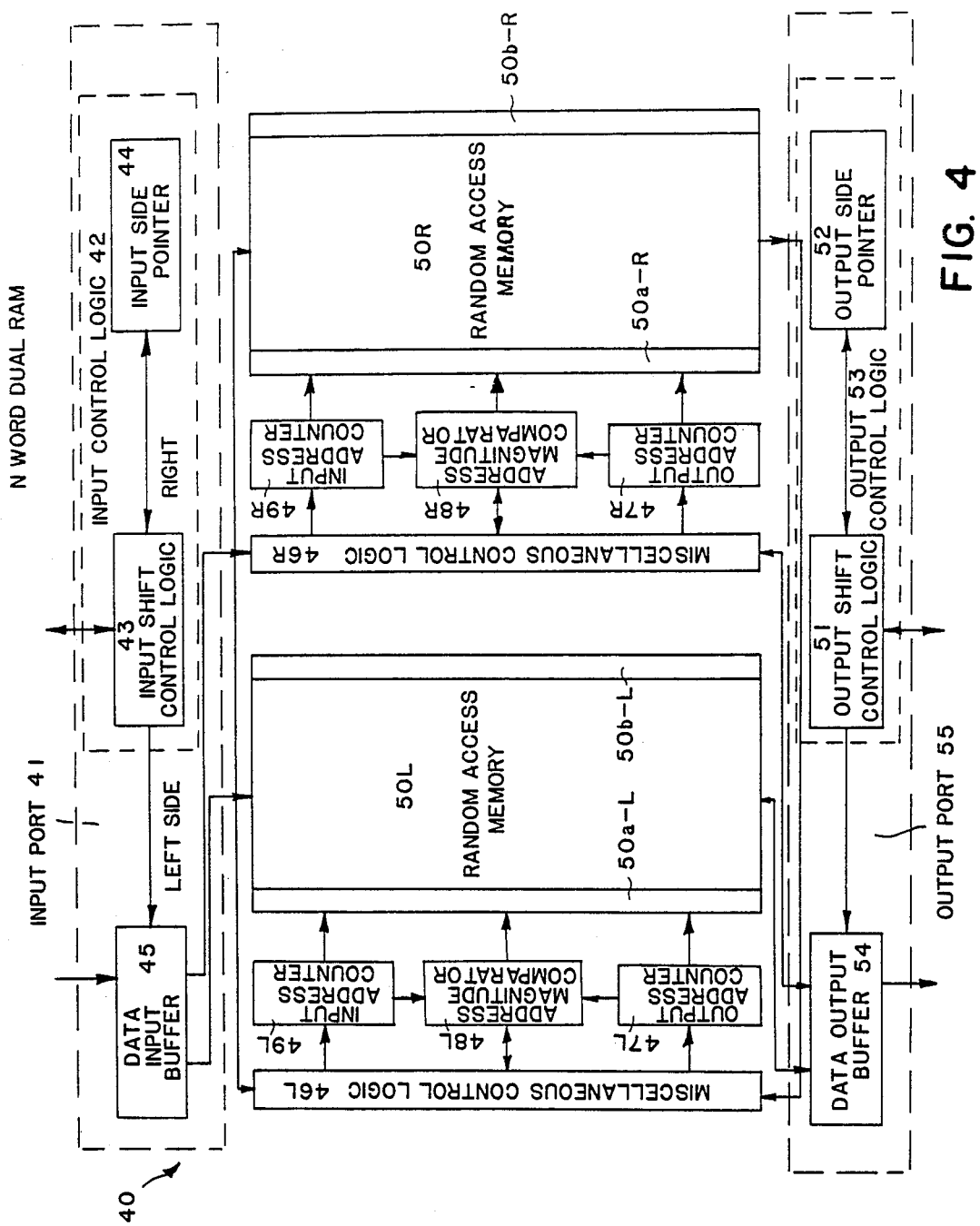
FIG. 4 is a block diagram of an N-word dual RAM FIFO memory system constructed in accordance with an embodiment of this invention.

One embodiment of a high-speed pointer-based FIFO memory system constructed in accordance with this invention is depicted in FIG. 4. FIG. 4 is a block diagram showing an N word dual RAM FIFO memory system 40 where N is an even, positive integer. Input control logic 42 provides the control signals for input port 41 and for interfacing data input buffer 45 with the left and right RAMs 50L and 50R, respectively. Data input buffer 45 electrically buffers the input signals which appear at input port 41 and generates the voltage levels of the data input signals required by RAMs 50L and 50R. Input side pointer 44 directs input shift control logic 43 to operate alternately with successive input cycles on the two RAMs 50L and 50R. Similarly, output control logic 53 includes output side pointer 52 which directs output shift control logic 51 to operate alternately with successive output cycles on the two RAMs 50L and 50R. Data output buffer 54 electrically buffers the signals representing a data word read out of the selected storage location in RAMs 50L or 50R.

When memory system 40 is initialized, the N/2 storage locations in RAM 50L are empty and both input address counter 49L and output address counter 47L point to address zero and write ring pointer 50a-L and read ring pointer 50b-L point to the word storage location corresponding to the zero address. Similarly, when memory system 40 is initialized, the N/2 storage locations in RAM 50R are empty and both input address counter 49R and output address counter 47R point to address zero and write ring pointer 50a-R and read ring pointer 50b-r point to the word storage location corresponding to the zero address in RAM 50R. Also, when system 40 is initialized, input side pointer 44 and output side pointer 49 both point to left RAM 50L. (This convention could, of course, be reversed.)

Figure 1:
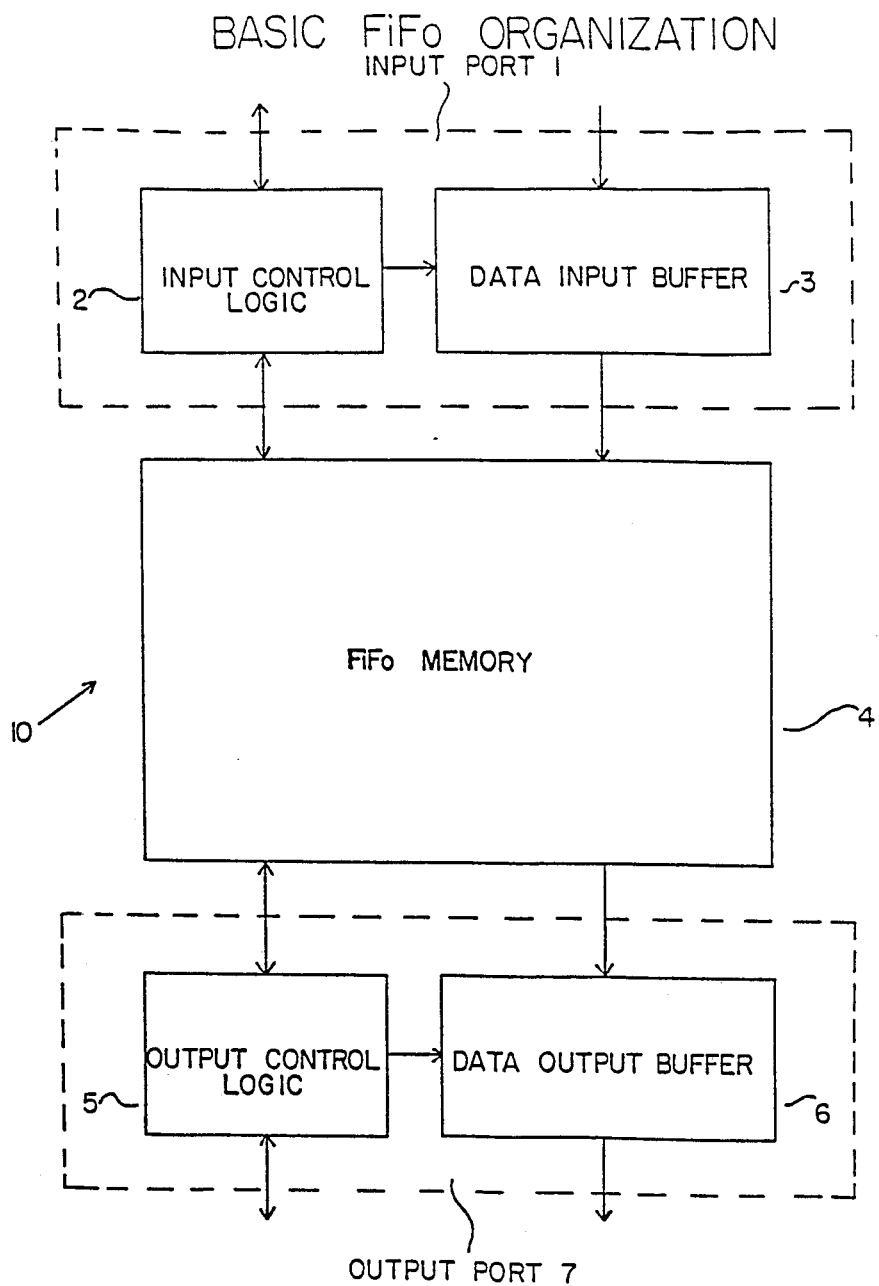
FIG. 1 is a block diagram of a FIFO memory system.
Figure 2:
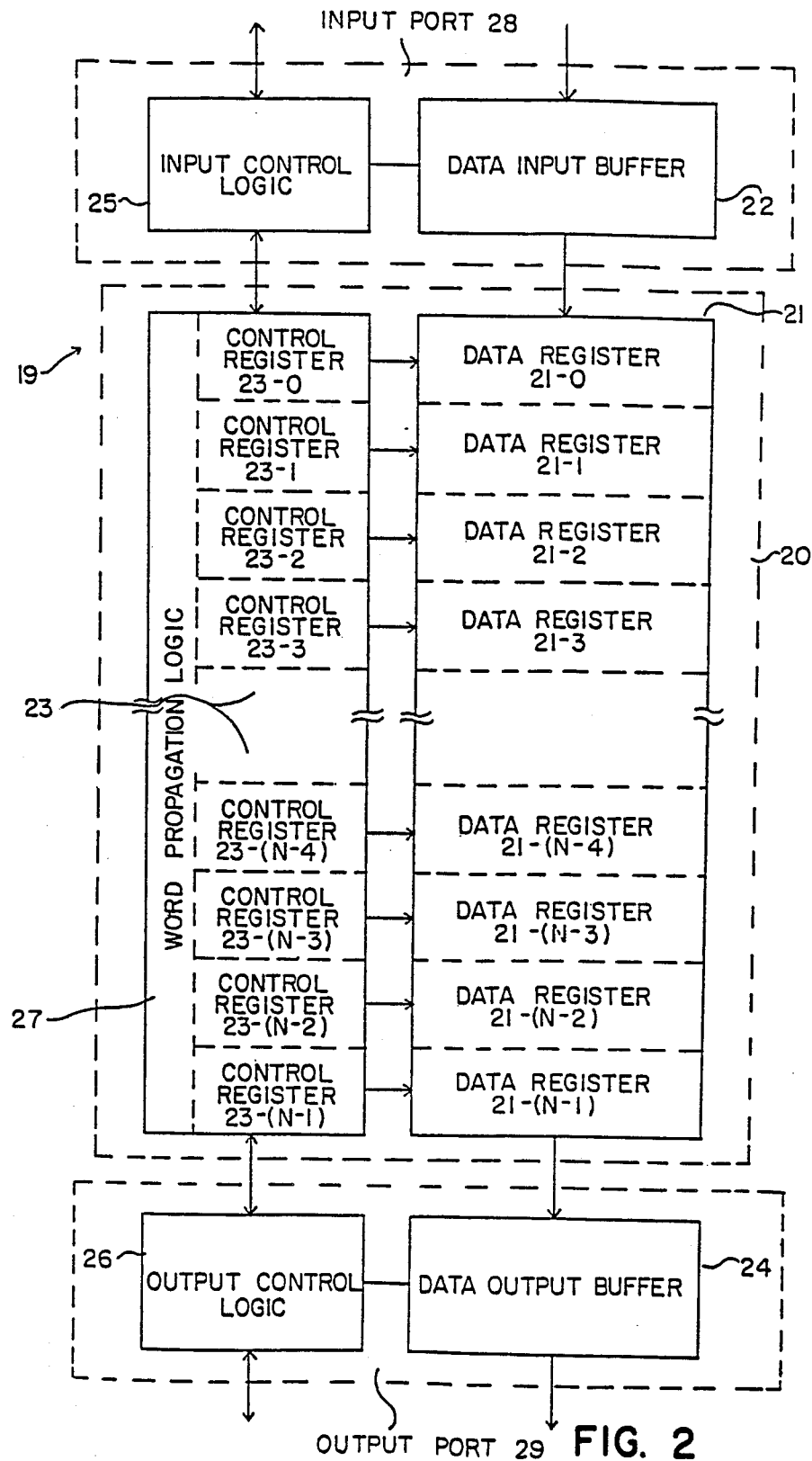
FIG. 2 is a block diagram of a prior art fall-through FIFO memory system.
Figure 3:
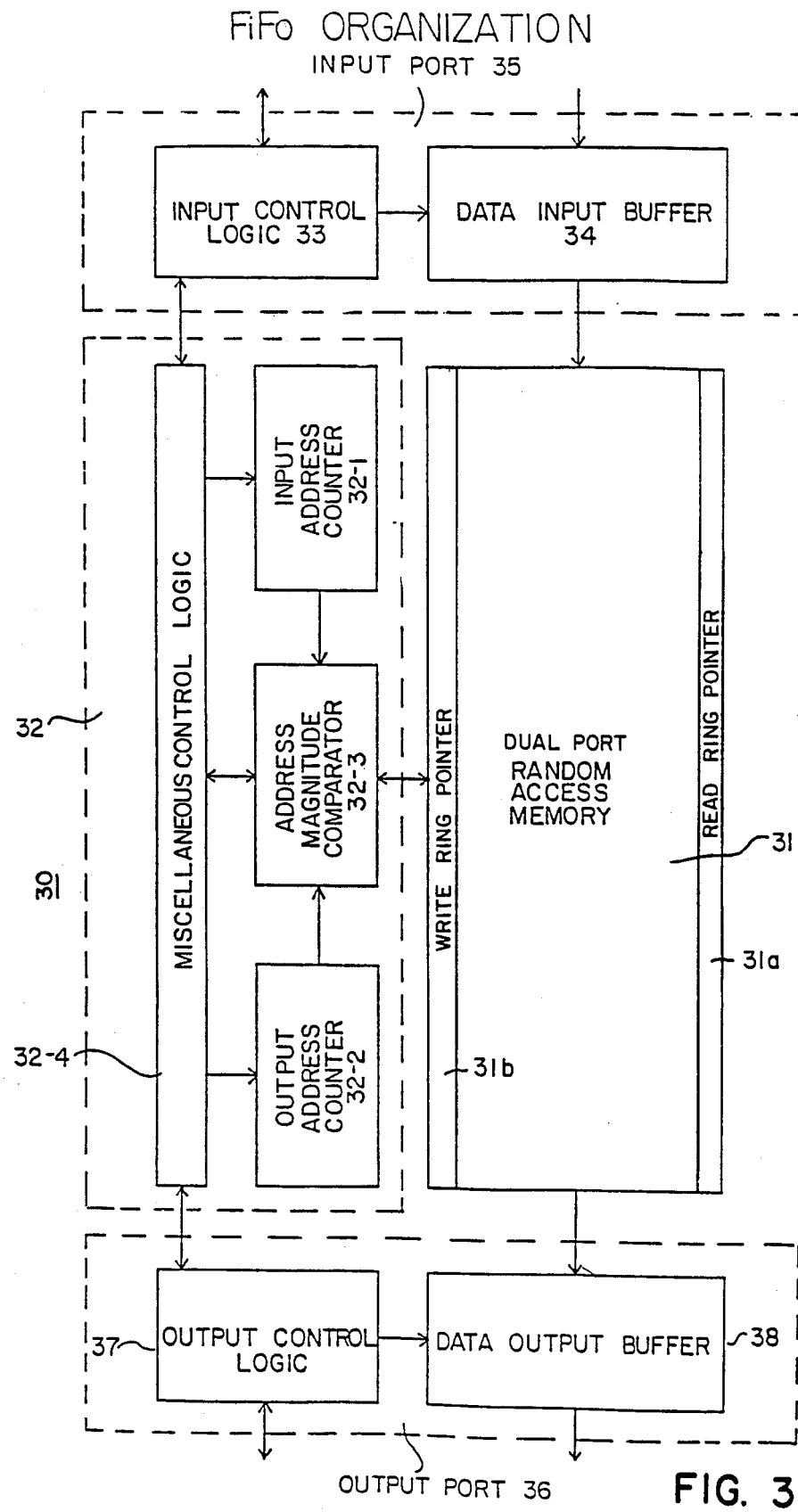
FIG. 3 is a block diagram of a prior art pointer-based FIFO memory system.

The first data input word W(0) enters the storage location having address zero in RAM 50L under the control of left side miscellaneous control logic 46 where it remains until shifted out. The second data word W(1) is shifted in, directed by input side pointer 44, and is stored in the storage location having address zero in the right RAM 50R where it remains until shifted out. In general, the data word W(k) is shifted into RAM 50L if k is even and entered in RAM 50R if k is odd, for $k=0,1,\ldots$ Right side miscellaneous control logic 46R, output address counter 47R, address magnitude comparator 48R, input address counter 49R, write ring pointer 50a-R, read ring pointer 50b-R, and RAM 50R form an N/2 word pointer-based FIFO memory system which operates as described for circuits 30, 31, 31a and 31b of FIG. 3. Similarly, left side miscellaneous control logic 46L, output address counter 47L, address magnitude comparator 48L, input address counter 49L, write ring counter 50a-L, read ring counter 50b-L and RAM 50L form an N/2-word pointer-based FIFO memory system which operates as described for circuits 30, 31, 31a and 31b in FIG. 3.

Once memory system 40 has been initialized, output shift control logic 51, under the direction of output side pointer 52, determines if data is present in the storage location in RAM 50L corresponding to the address to which output address counter 47L points. When data is present, output shift control logic 51, under the direction of output side pointer 52, alternately shifts data from the storage location corresponding to the address L0 to which the output address counter 47L points, and the storage location corresponding to the address to which output address counter 47R points.

Figure 5:
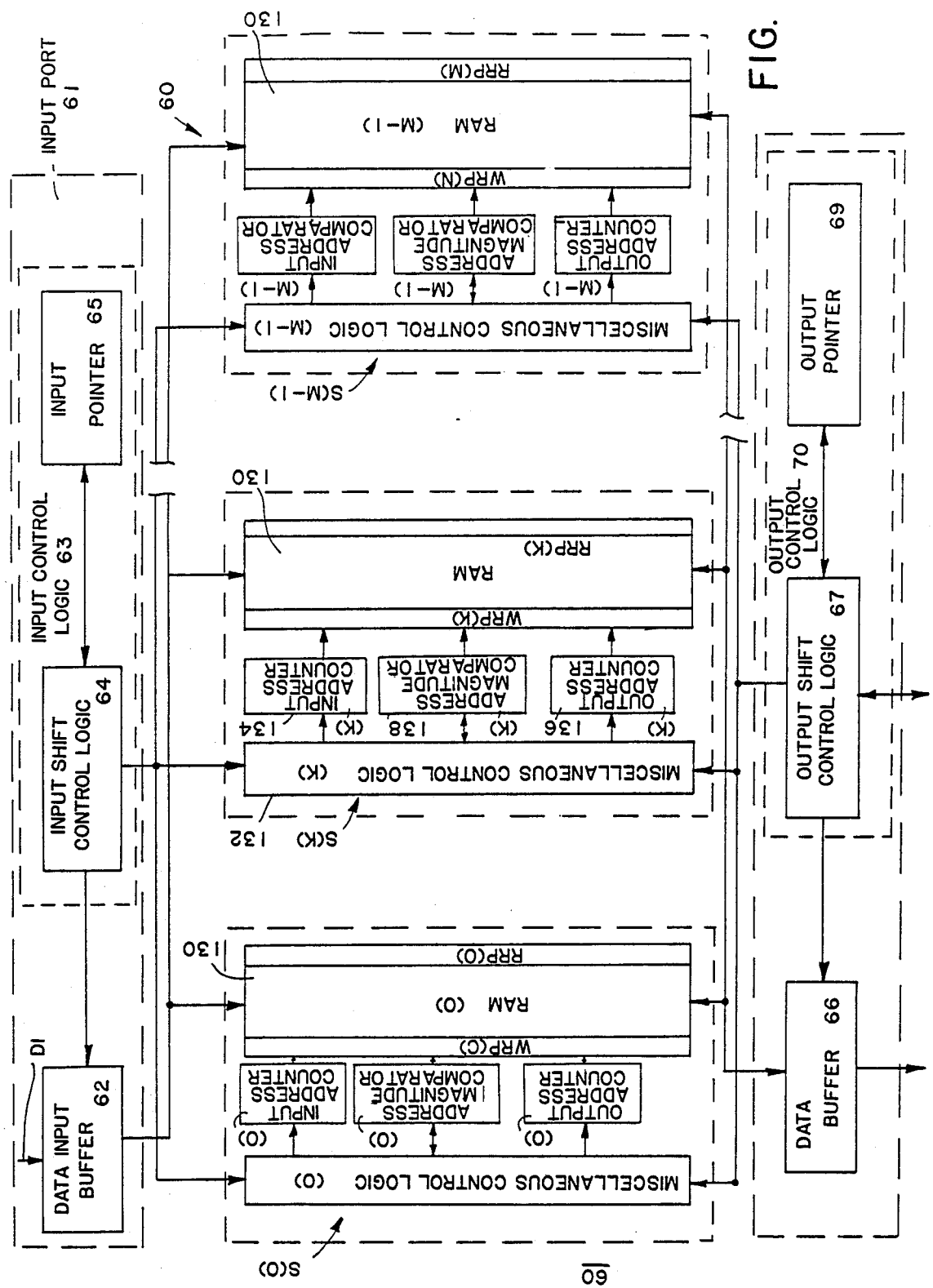
FIG. 5 is a block diagram of an N-word M-RAM FIFO memory system constructed in accordance with an embodiment of this invention.

The principles described above may be extended to the case of the system comprising M pointer-based RAMs. In this embodiment of the invention, an N-word M RAM memory system 60 is constructed where M is any positive integer greater than or equal to 2, satisfying the condition that N is congruent O (mod M) i.e. M divides N evenly. A block diagram of one embodiment of this M RAM architecture is depicted in FIG. 5. An N word memory is organized into M pointer-based RAM segments S(O) through S(M−1). Each RAM segment contains a RAM having N/M word storage locations. In the circuit shown in FIG. 5, RAM segment S(k) includes RAM (k)130, control logic (k)132, input address counter (k)134, output address counter (k)136, and address magnitude comparator (k)138 which function together as explained in connection with circuits 30, 31, 31a and 31b shown in FIG. 3 for $k=1,\ldots,M$.

Input port 61 includes data input buffer 62 and input control logic 63. Input control logic 63 includes input shift control logic 64 and input segment pointer 65, and directs a sequence of data input words W(i), $i=0,1,\ldots$, in the order received, into memory 60 where the data word W(i) is shifted into RAM (i(mod M)) only if the storage location corresponding to the address to which input address counter i (mod M) points is empty. Data input buffer 62 functions analogously to data input buffer 45 shown in FIG. 4. Output control logic 70 includes output shift control logic 67 and output segment pointer 69. Output control logic 70 shifts the data word W(O) out of RAM (O) and shifts the data word W(i) out of RAM (i (mod M)) only if the data word W(i−1) has previously been shifted out of RAM (i−1) (mod M) for $i=1,2,\ldots,$. Data output buffer 66 functions analogously to data output buffer 54 shown in FIG. 4. Input port 61 and output port 68 may, if desired, be operated asynchronously.

Increasing the number, M, of RAMs in an N word memory, has a number of advantages. First, there is an obvious reduction in the time required to write a word into (or read a word out of) the memory system since this time tends to increase as the number of words in the RAM increases. Secondly, and more importantly, the maximum shift rates at the input and output ports can be increased to a rate which is essentially limited by the technology employed to implement the control logic. Theoretically, the maximum shift rate at the input and output port would continue to increase as M is increased. In practice, it will take the control logic X nanoseconds to perform its logical operations. If it is desired to provide a memory system with N storage locations and if t(N, M) is the time required to write a data word into or read a data word out of a pointer-based RAM having N/M storage locations and if tCL is the time required for the control logic to perform its logical operations, then M, the smallest number of pointer-based RAMs employed in the system that will maximize the shift rates at the ports satisfies the equation $t(N,M)=tCL.M$ so that $M=t(N, M)/tCL$. Some rounding may be necessary since M must be an integer which divides N evenly. Thus the present invention provides an M fold increase in input (and output) shift rates, since M words are simultaneously in the shift-in (or shift-out process, albeit at different stages of this process.

FIGS. 6 through 18 provide a more detailed description of the invention for the case where M=4, N=64, and N/M=16, and each word is five data bits wide, i.e., 64 word storage locations are organized into four memory segments, each memory segment containing a RAM having 16 words, each word containing five data bits.

Figure 6:
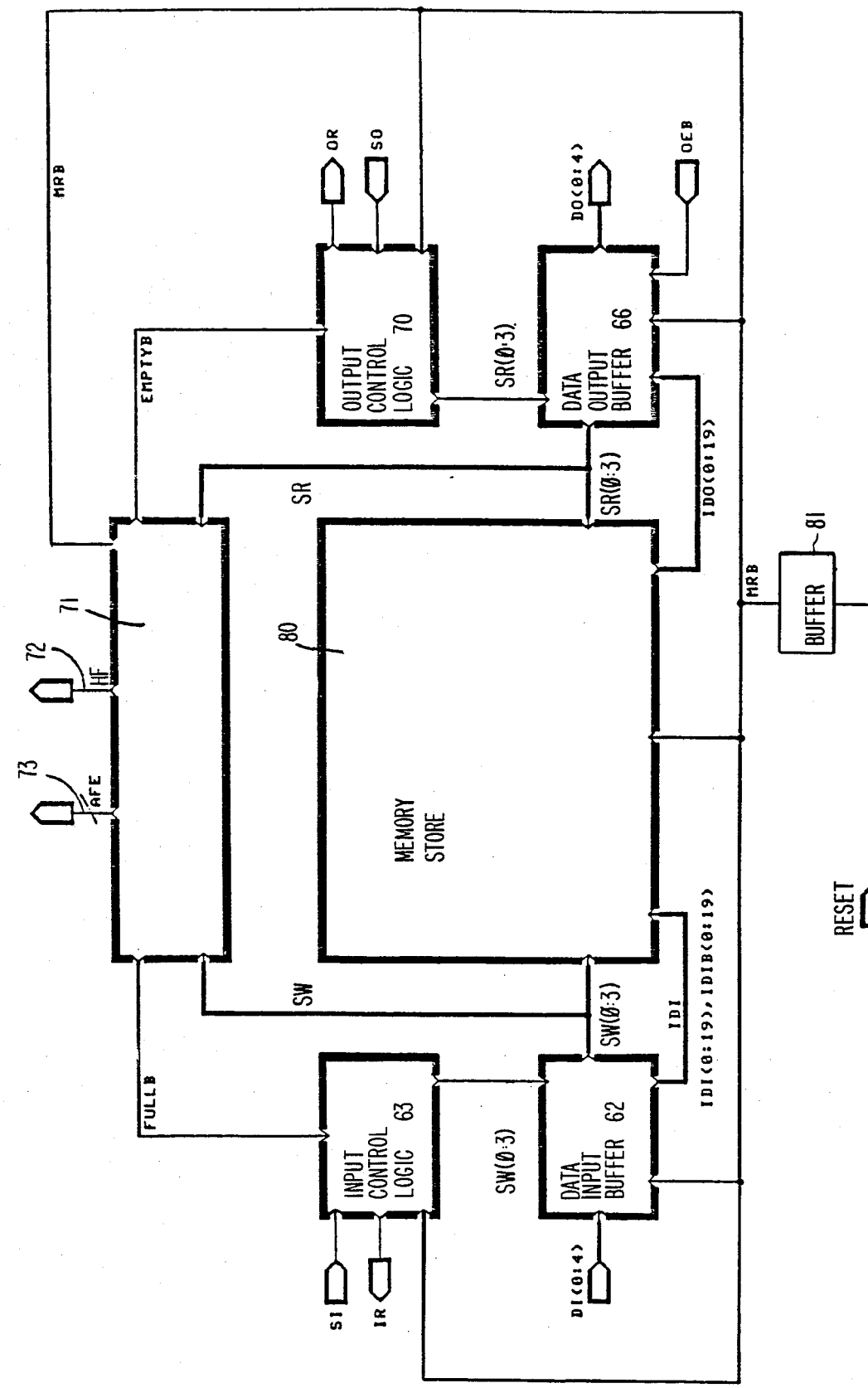
FIG. 6 is a block diagram of one embodiment of the invention for the case where $M=4$, $N=64$, and $N/M=16$.

FIG. 6 shows a block diagram of the system. In general, data input buffer 62, input control logic 63, data output buffer 66 and output control logic 70 function as previously explained in connection with correspondingly labeled elements shown in FIG. 5 (where M=4). The master reset bar signal is a low going pulse provided via buffer 81 on lead MRB to initialize the system. When the system is ready to receive data, control logic 63 provides an input-ready signal to the user on lead IR. The user provides a shift in signal SI to control logic 63 on lead SI. A data word enters input buffer 62 on data input bus DI and, in response to segment write control signals on bus SW (0:3) generated by input control logic 63, provides data to a selected memory segment in storage block 80. (The memory segments in storage block 80 are shown in detail in FIGS. 9 through 14.) Similarly, a data word exits the memory system from data output buffer 66 on data out bus DO in response to read control signals from output control logic 70. Block 71 includes optional circuitry that generates status indicators. Signal AFE (almost full or empty) at terminal 73 and signal HF (half full) at terminal 72 provide useful status indications. Details of the circuit of block 71 are described with reference to FIG. 14.

Figure 7:
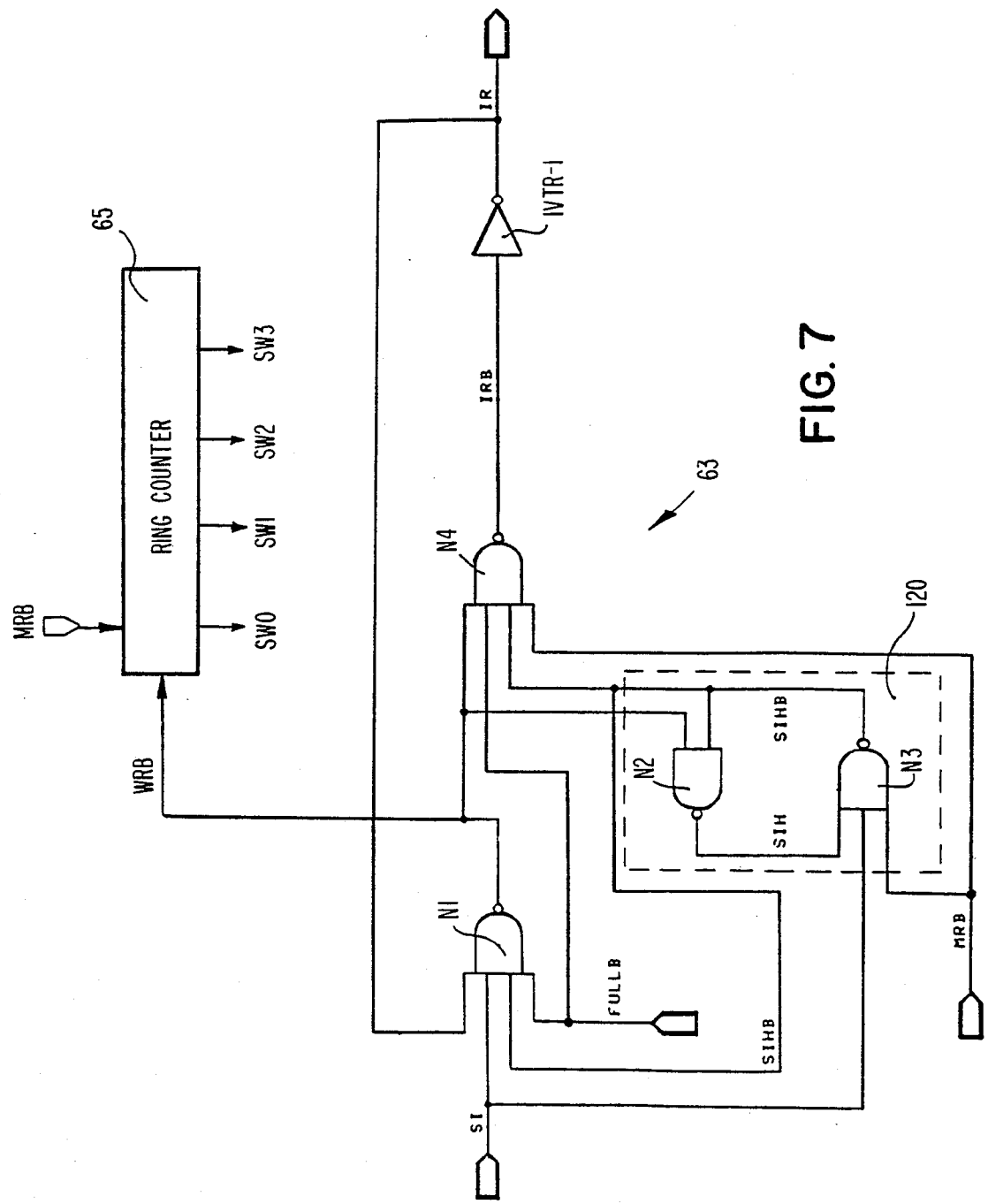
FIG. 7 is a logic circuit diagram of control logic block 63 shown in FIG. 6.

FIG. 7 is a schematic diagram of input control logic 63. A low pulse on master reset bar lead MRB resets four-bit ring counter 65 to (1,0, 0, 0) and provides a low input signal to NAND gate N1 via NAND gate N4 and inverter IVTR-1, forcing the output signal write bar (WRB) to ring counter 65 to go high. The low pulse on lead MRB also causes the shift in hold bar output signal from flip flop 120 to NAND gate N1 to go high.

When the signal on master reset bar lead MRB goes high, inverter IVTR-1 provides a high input ready signal IR to the user and to NAND gate N1. Assuming that the memory is not full, the signal to NAND gate N1 on full bar lead FULLB is also high. Thus, when NAND gate N1 receives a high input signal on shift-in lead SI, the write bar signal on lead WRB goes low for approximately three gate delays until the low write bar signal is propagated through NAND gate N4, inverter IVTR-1 and NAND gate N1, forcing the write bar signal high again. The low write bar signal also sets flip-flop 120 so that two gate delays later shift-in-hold bar goes low. Thus, when the write bar signal goes high, it is prevented from going low again until after the shift-in signal has gone low, causing shift-in-hold bar to go high. This, in effect, prevents multiple low write bar signals from being generated by a long, high shift-in pulse.

The first low write bar signal on WRB causes ring counter 65 to provide segment write signals SW0, SW1, SW2, and SW3 to become 0, 1, 0, 0, respectively. Each subsequent low pulse on WRB causes the "1" to shift one position to the right in a cyclical fashion modulo 4 in ring counter 65. When storage block 80 is full, a low signal is provided on lead FULLB, blocking any further attempt to input data by forcing the write bar signal on lead WRB to go high. The segment write control signals, SW0, through SW3 are provided to data input buffer 62 shown in FIG. 8.

Figure 8A:
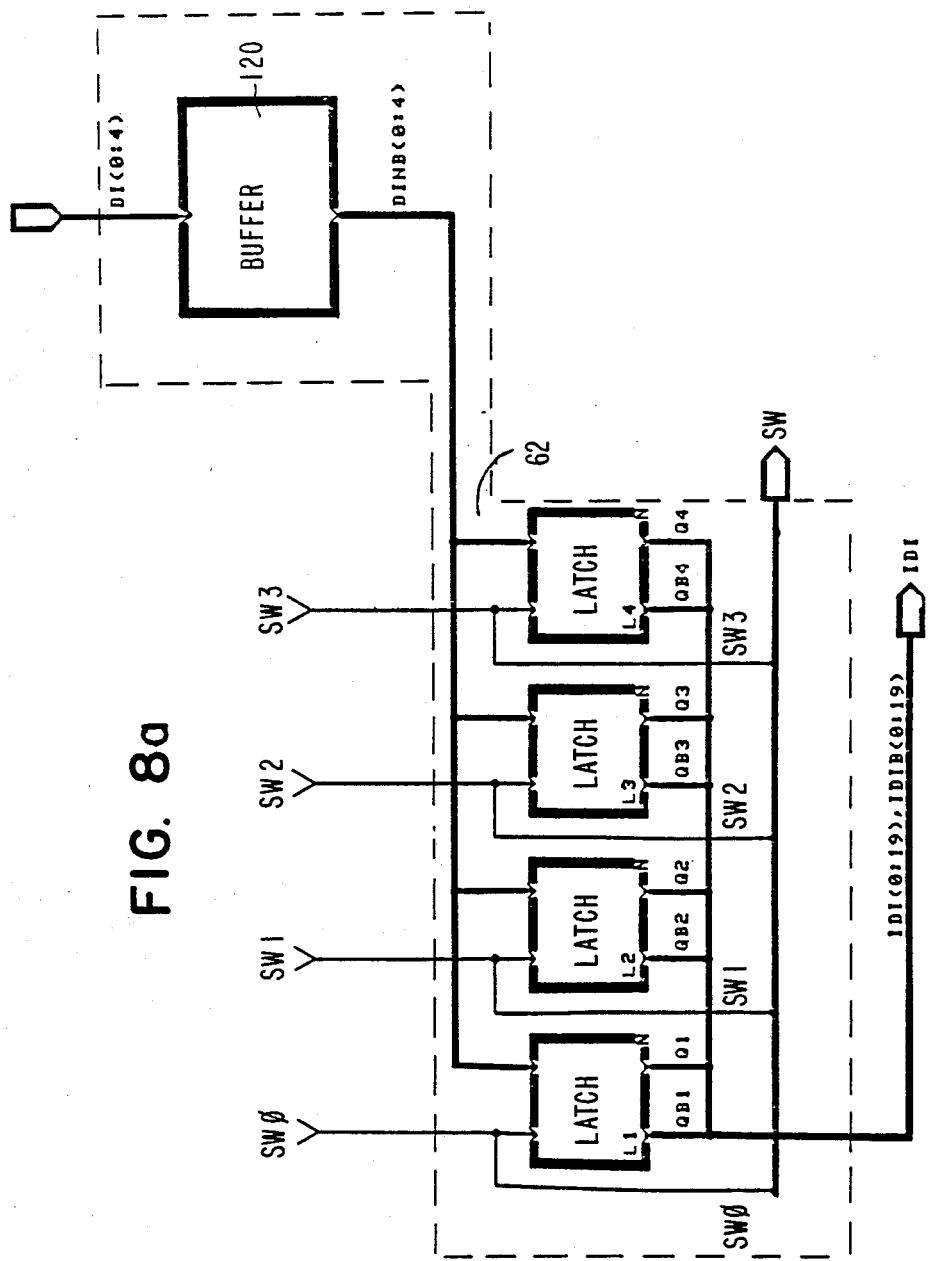
FIG. 8a shows a block diagram of data input buffer 62 shown in FIG. 6.
Figure 8B:
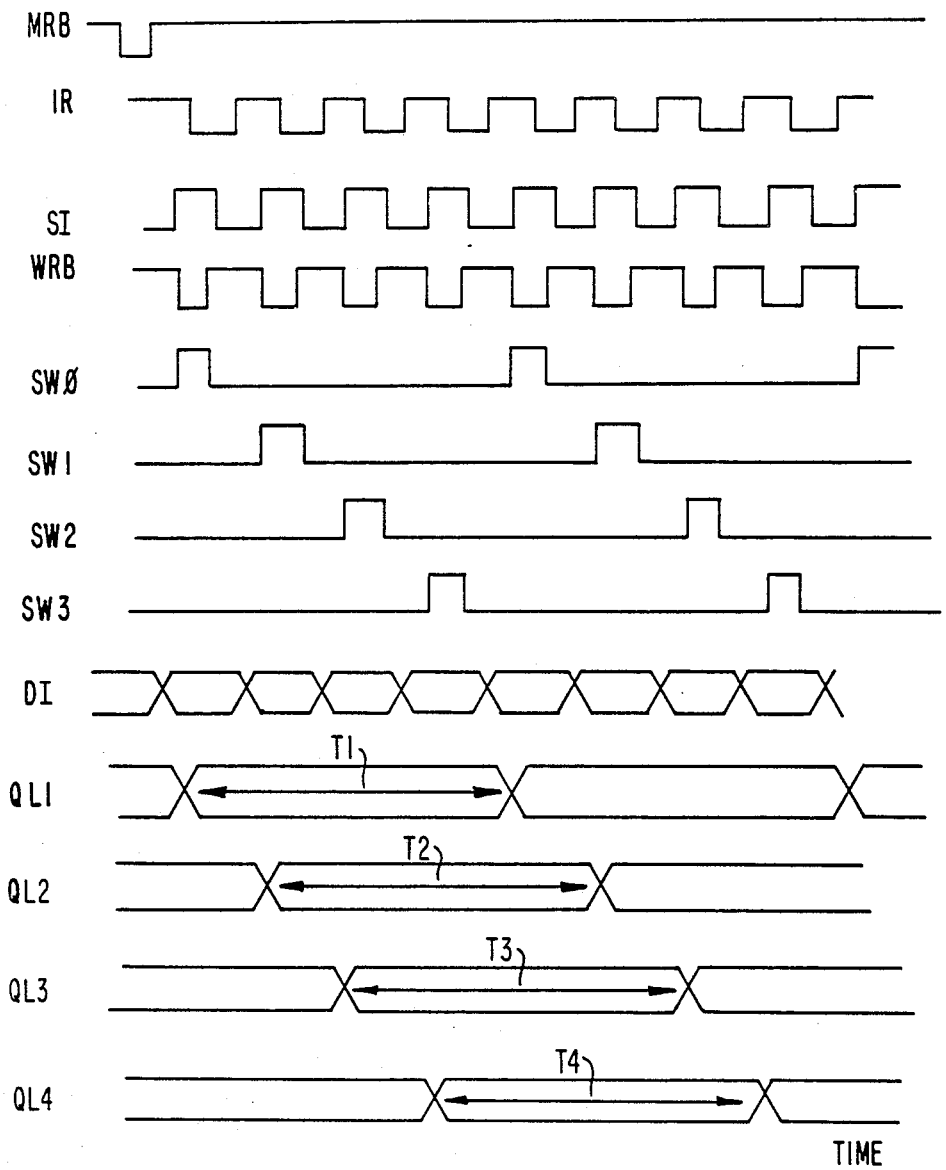
FIG. 8b shows a timing diagram for several data and control signals.

Data input buffer 62 comprises latches L1, L2, L3, and L4, and buffer 120. A 5-bit data word, after being buffered by buffer 120, is stored in that one of latches L1 through L4 whose clock signal SW0 through SW3, respectively, goes high first. Each latch is transparent when its clock signal is high. FIG. 8b shows a timing diagram for the signals: input ready, IR; shift-in, SI; write bar, WRB; segment write signals SW0, SW1, SW2, and SW3; data-in, DI; and the data bus output signals QB1, Q1; QB2, Q2; QB3, Q3; and QB4, Q4 of latches L1, L2, L3, and L4, respectively. The data in the latch corresponding to the high segment write signal, together with the high segment write signal is presented to the corresponding memory segment shown in FIG. 9. Each 5-bit-wide data bus DI0 through DI3 presents the 5-bit data word stored in the corresponding latch shown in FIG. 8a to the corresponding memory segment shown in FIG. 9 when the corresponding segment write signal is high via bus IDI. It should be noted that during the time period T1 (shown schematically by arrow T1 in FIG. 8b), while data is being shifted into segment S(0), data begins to be shifted into segments S(1), S(2) and S(3) during the time intervals T2 through T4, respectively. This overlapping of shift in cycles provides the approximately 4-fold improvement in the time required to write a long sequence of words to the memory.

Figure 9:
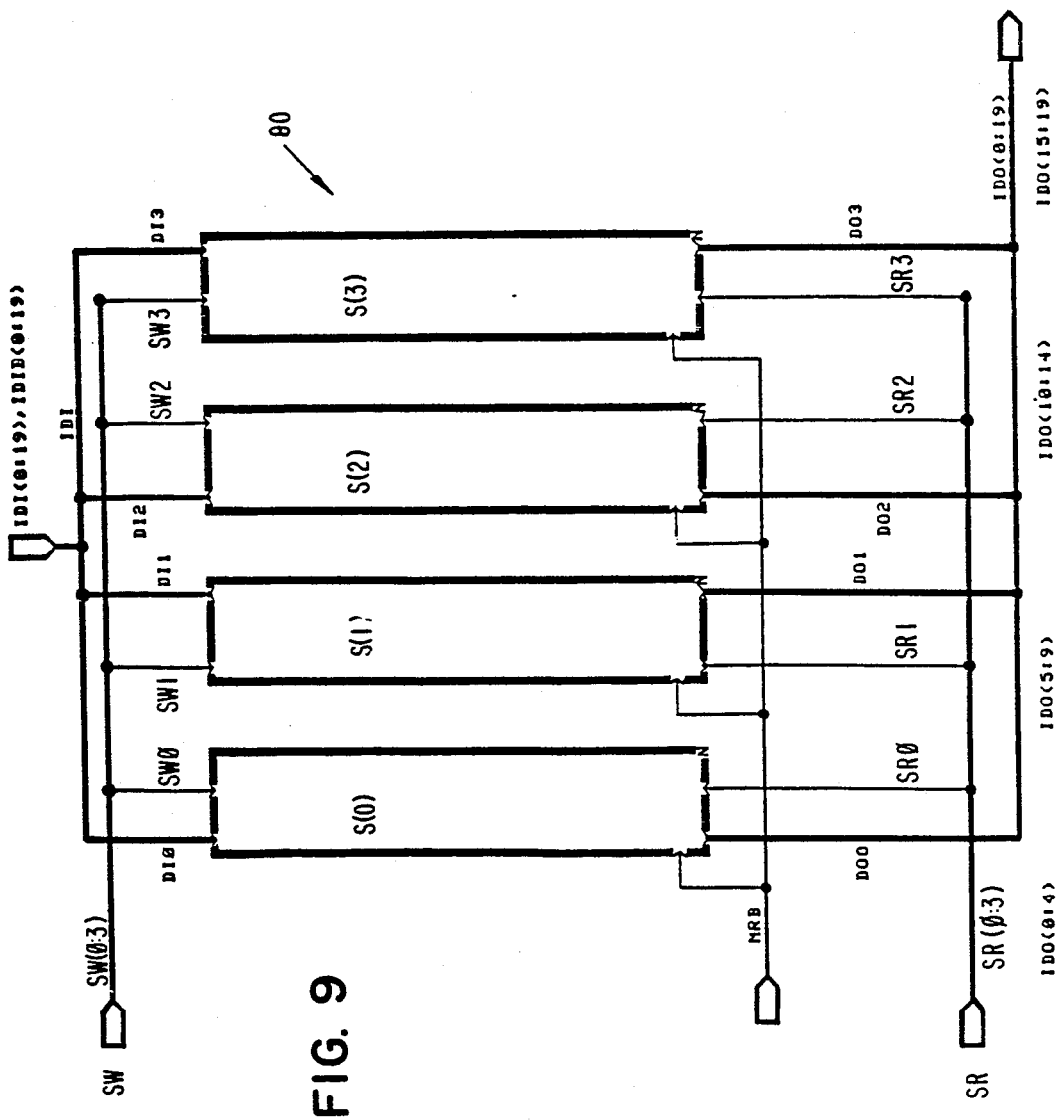
FIG. 9 shows a block diagram of memory 80 shown in FIG. 6.
Figure 10:
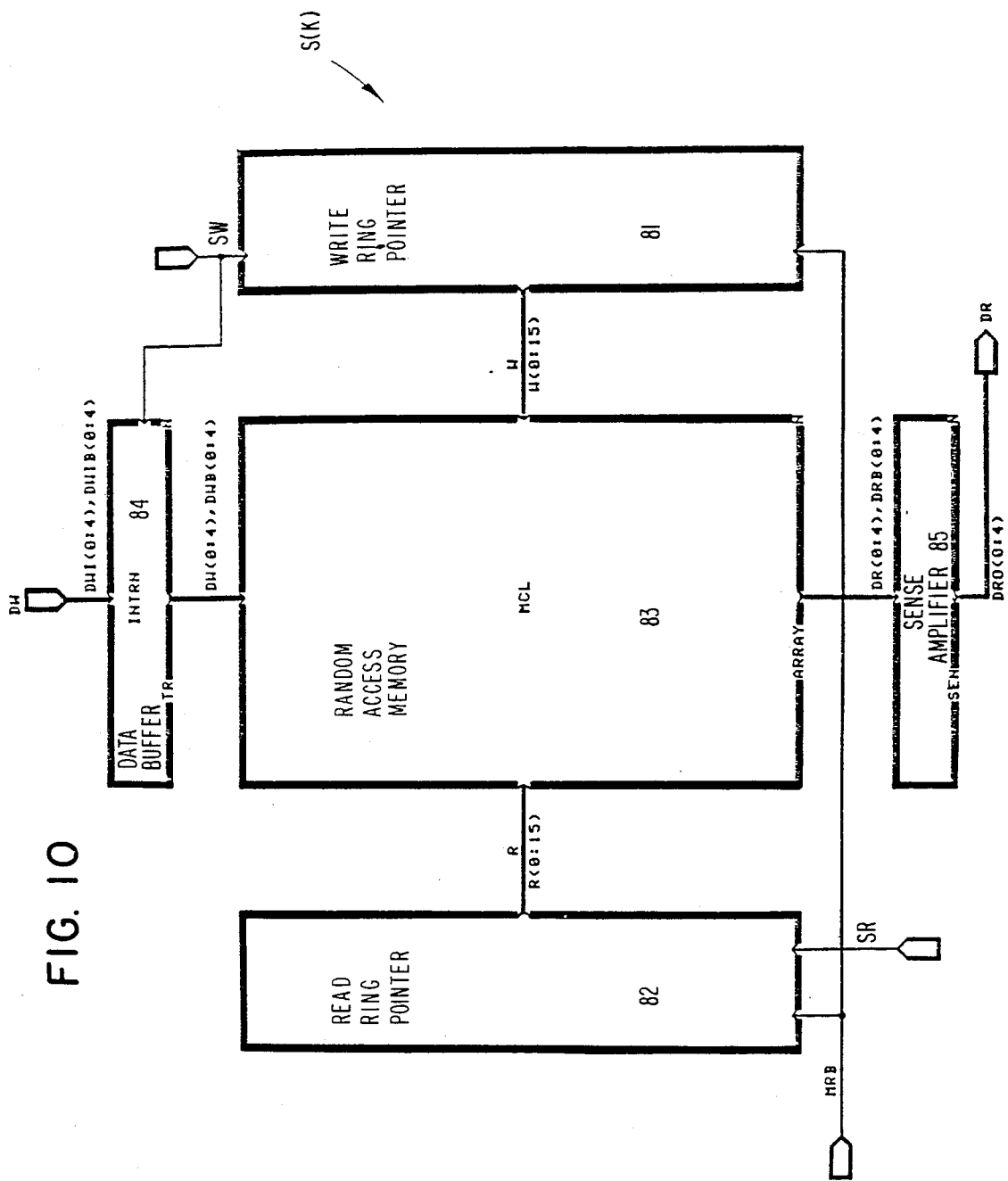
FIG. 10 shows a block diagram of a typical memory segment shown in FIG. 9.

FIG. 10 provides a partial schematic diagram of a typical memory segment S(K), where k=0, ... ,3. (Segments S(0) through S(3) are identical.) Each memory segment comprises a read ring pointer 82, a write ring pointer 81, and a dual port (dual accessible) RAM 83 (shown in detail in FIG. 11) which function together as explained in conjunction with a typical memory segment of FIG. 5. Each memory segment S(0) through S(3) also contains an input counter 90, and output counter 91 (shown schematically in FIG. 14) and a comparator 100 (shown in FIG. 15). A data word on bus DW (which is either bus DI0, DI1, DI2, or DI3 in FIG. 9) is provided to data buffer 84. In response to a segment write signal on lead SW (which is the same as lead SW0, SW1, SW2, or lead SW3 in FIG. 9), a data word is stored in the particular storage location in dual port RAM 83 to which write ring pointer 81 points via line W. Similarly, in response to a segment read signal on lead SR (which is either lead SR0, SR1, SR2 or SR3 in FIG. 7), a data word stored in a particular storage location of dual port RAM 83 to which read ring pointer 82 points (via line R) is provided on data read bus DR,DRB to output sense amplifier 85 and then to RAM segment data output line bus DR (which may be either bus DO0, DO1, DO2, or DO3, as shown in FIG. 9).

Figure 11:
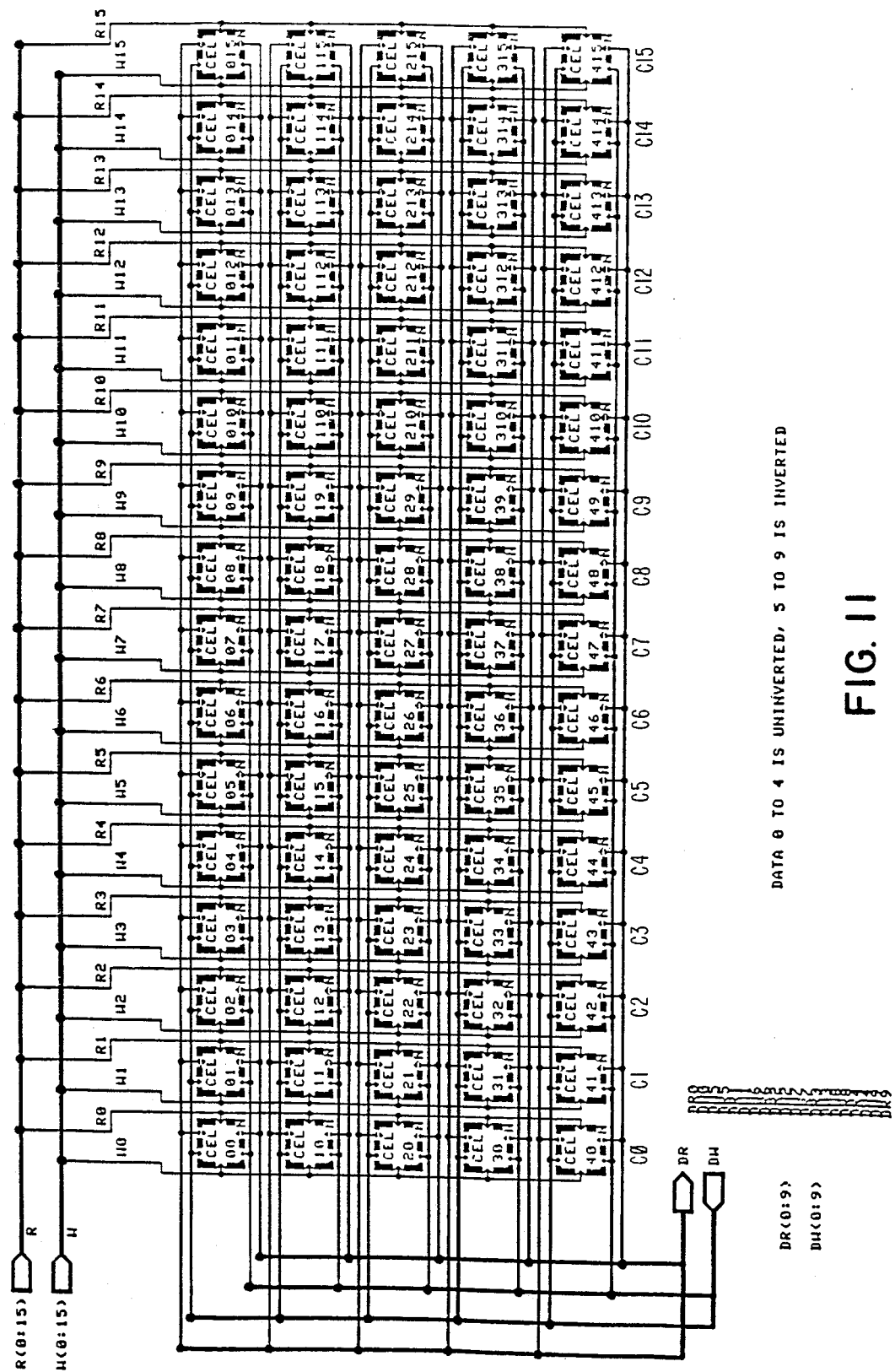
FIG. 11 shows a block diagram of dual port RAM 83 of FIG. 10.

FIG. 11 provides a block diagram of dual port (dual accessible) RAM 83 of FIG. 10. RAM 83 comprises 16 word storage locations, each word storage location comprising a row of memory cells. A data word present on data bus DW is stored in the particular row of memory cells to which write ring pointer 81 (FIG. 10) points on bus W. Similarly, in response to a read signal, a data word stored in the particular row of memory cells to which read ring pointer 82 points via bus R is provided on data output bus DR to sense amplifier 85 (shown in FIG. 10).

Figure 12:
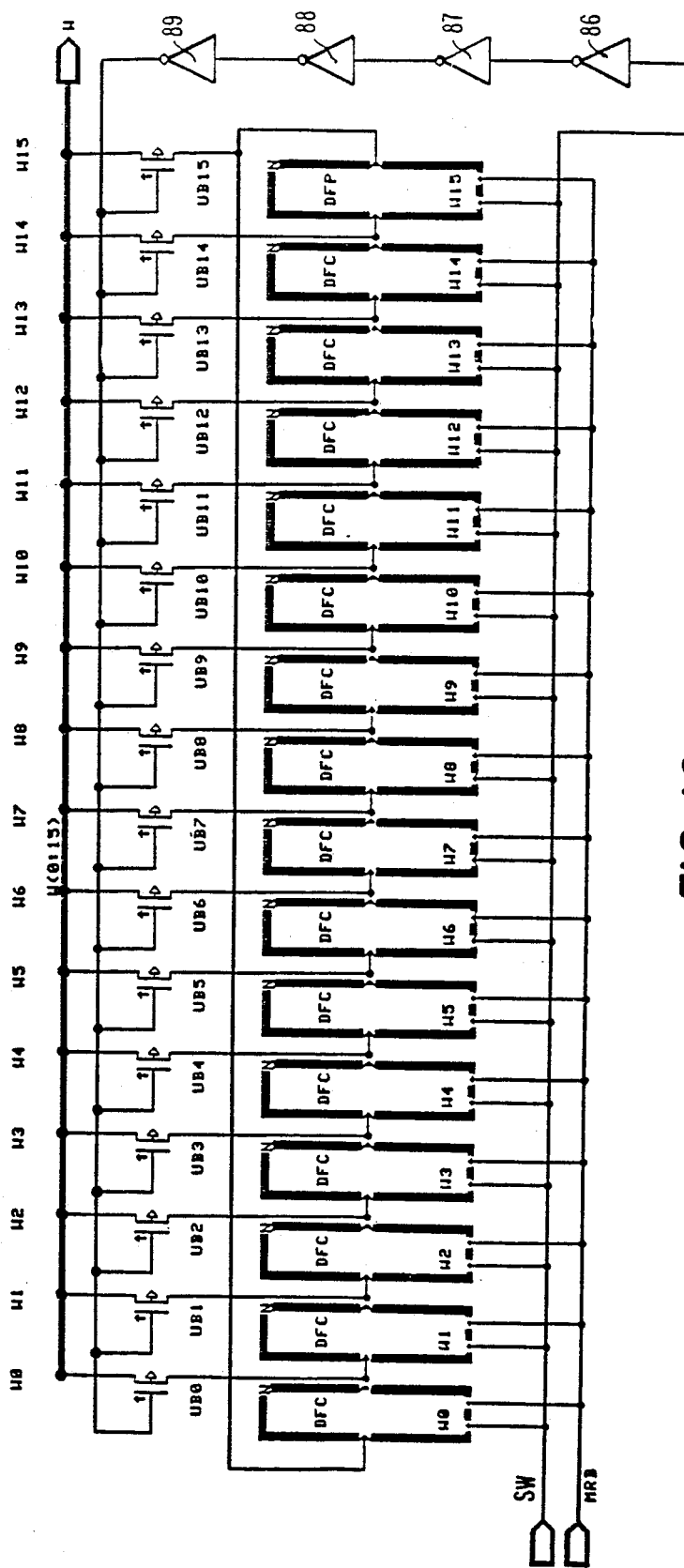
FIG. 12 provides a block diagram of write ring pointer 81 shown in FIG. 10.

FIG. 12 depicts a write ring pointer 81 that comprises 16 D flip-flops W0 through W15. Flip-flops W0 through W14 are D flip-flops with clear, and flip-flop W15 is a D flip-flop with a preset. When write ring counter 81 is initialized by a master reset bar signal, flip-flop W0 through W14 provide a zero output signal and D flip-flop W15 provides a "1" output signal. The output signals from D flip-flop W0 through W15 are provided to bus W via transmission gates UB0 through UB15 in response to a segment write signal on bus SW. When initialized, write ring pointer 81 points to word storage row 15. In response to the first write signal on bus SW, write ring pointer 81 points to word stage row O. Word storage row O comprises memory cells 00 through 40 in FIG. 11. Data on write bus DW is then stored in row O. The output signal from D flip-flop W(k) is also provided to D flip-flop W((k+1) MOD 16) for k=0, ... ,15, and thus the "1" output signal advances cyclically in response to clocking signals on bus SW. In general, when a data word is written into row k, write ring pointer 81 advances and points to the cyclically next row, namely row (k+1) MOD 16. Inverters 86 through 89 provide a timing delay.

Figure 13:
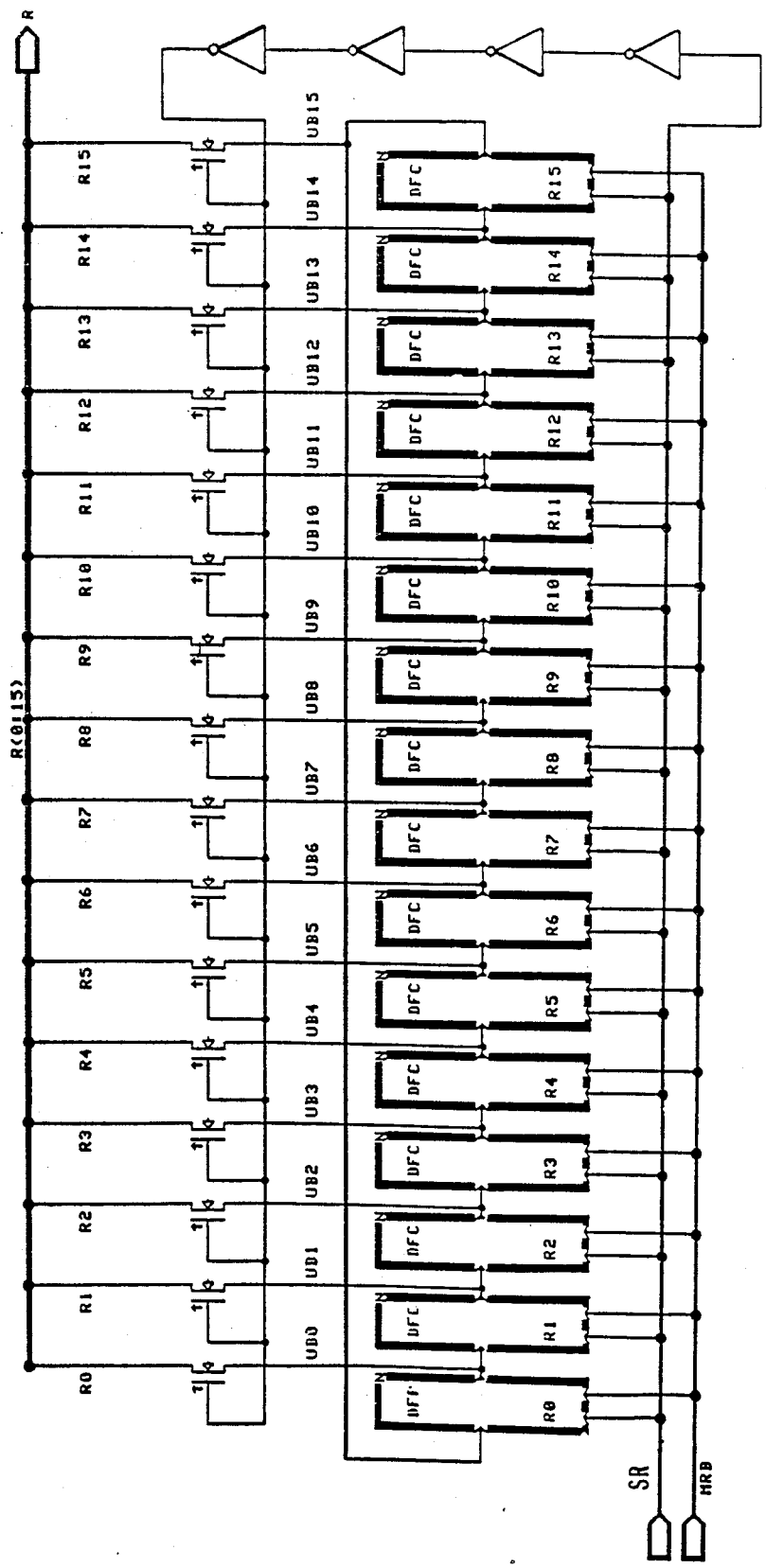
FIG. 13 provides a block diagram of read ring counter 82 shown in FIG. 10.

FIG. 13 provides a block diagram of read ring counter 82. Read ring counter 82 comprises flip-flops R0 through R15. Flip-flop R0 is a D flip-flop with preset, while flip-flop R1 through R15 are D flip-flops with clear. When initialized, the output signal of D flip-flop R0 is "1", and the output signal of D flip-flop R1 through R15 is logical O. When a segment read signal is present on bus SR, the output signals of flip flop R0 through R15 are provided to read bus R via transmission gate UB0 through UB15. Thus, with the first segment read signal on SR, read ring pointer 82 points to word storage row O (FIG. 11), comprising memory cells C00 through C40. The output signal of flip flop Rk is provided to flip-flop R(k+1) MOD 16, so that the logical "1" output signal advances cyclically with each new segment read signal on bus SR. Thus, after pointing to storage row k, read ring pointer 82 next points to storage row (k+1) MOD 16.

Figure 14:
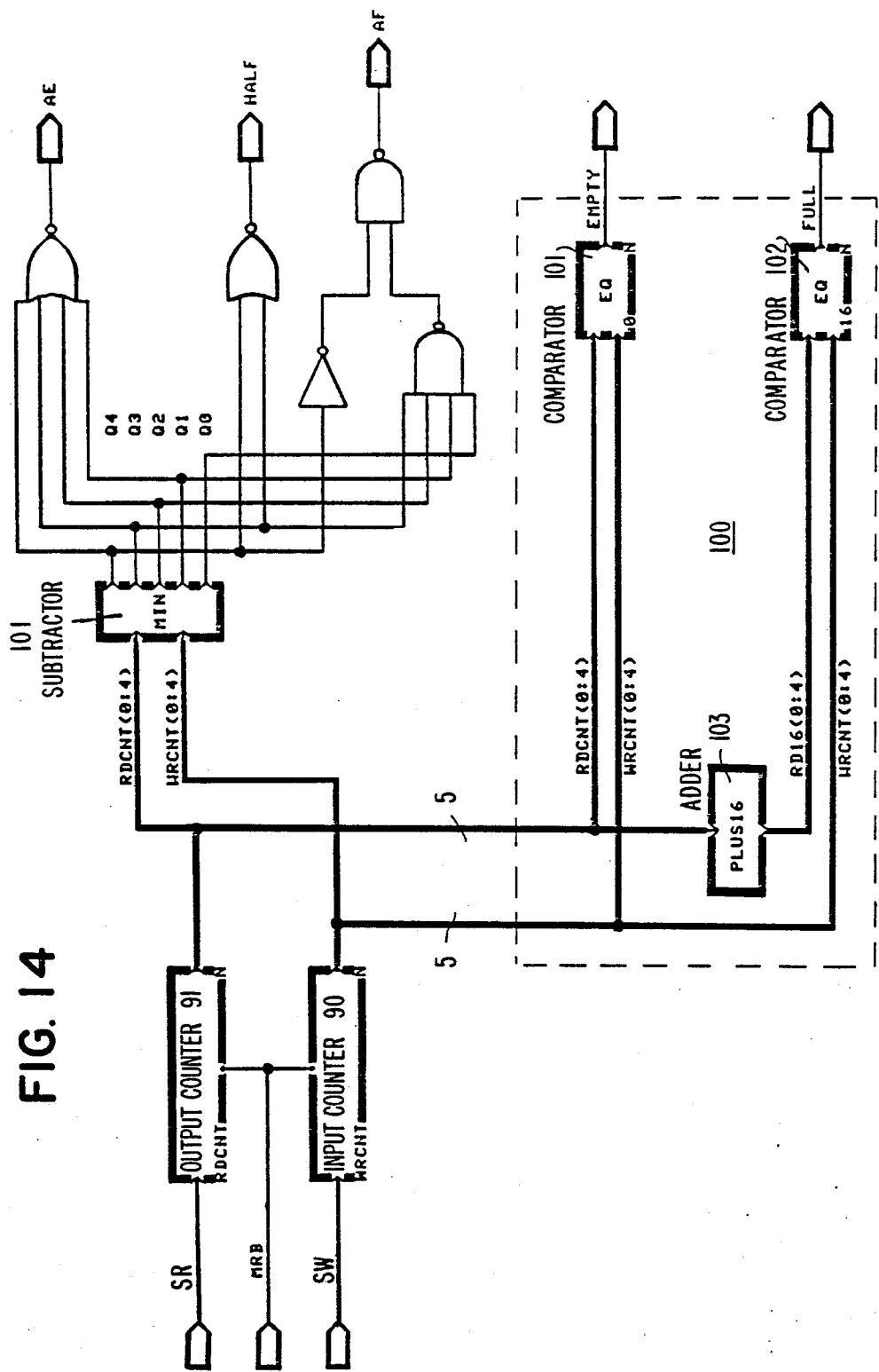
FIG. 14 shows a block diagram of input (write) counter 90 output (read) counter 91 and comparator 100 which are contained in each segment S(k) shown in FIG. 9.

FIG. 14 shows a schematic diagram of input (write) counter 90, output (read) counter 91, and comparator 100 which are contained in each segment S(0) through S(3) shown in FIG. 9. Both write counter 90 and read counter 91 are 5 bit counters initialized to (0,0,0,0,0) by a reset signal on MRB. Write counter 90 increments by one MOD 32 for each segment write signal received on lead SW. Similarly, read counter 91 increments by one modulo 32 for each segment read signal received on lead SR. Comparator block 100 compares the 5-bit write count in write counter 90 with the 5-bit read count in read counter 91 in comparator 101 and provides a signal indicating that the memory segment is empty when these two counts are equal. This signal prevents further data from being read out of an empty segment. Adder 103 adds 16 to the count in read counter 91 and comparator 102 compares this augmented count with the count in write counter 90 and provides the signal indicating that the memory segment is full when these two counts are equal. This signal prevents further data from being written into the memory segment. The remaining circuitry shown in FIG. 14 is optional and is used to provide the user with signals indicating the status of the memory. Subtractor 101 subtracts the read count from the write count and provides (1) an "almost empty" signal AE when this difference is 2; (2) an "almost full" signal AF when this difference is 14; and a half-full signal HALF when the difference is 8.

Figure 15:
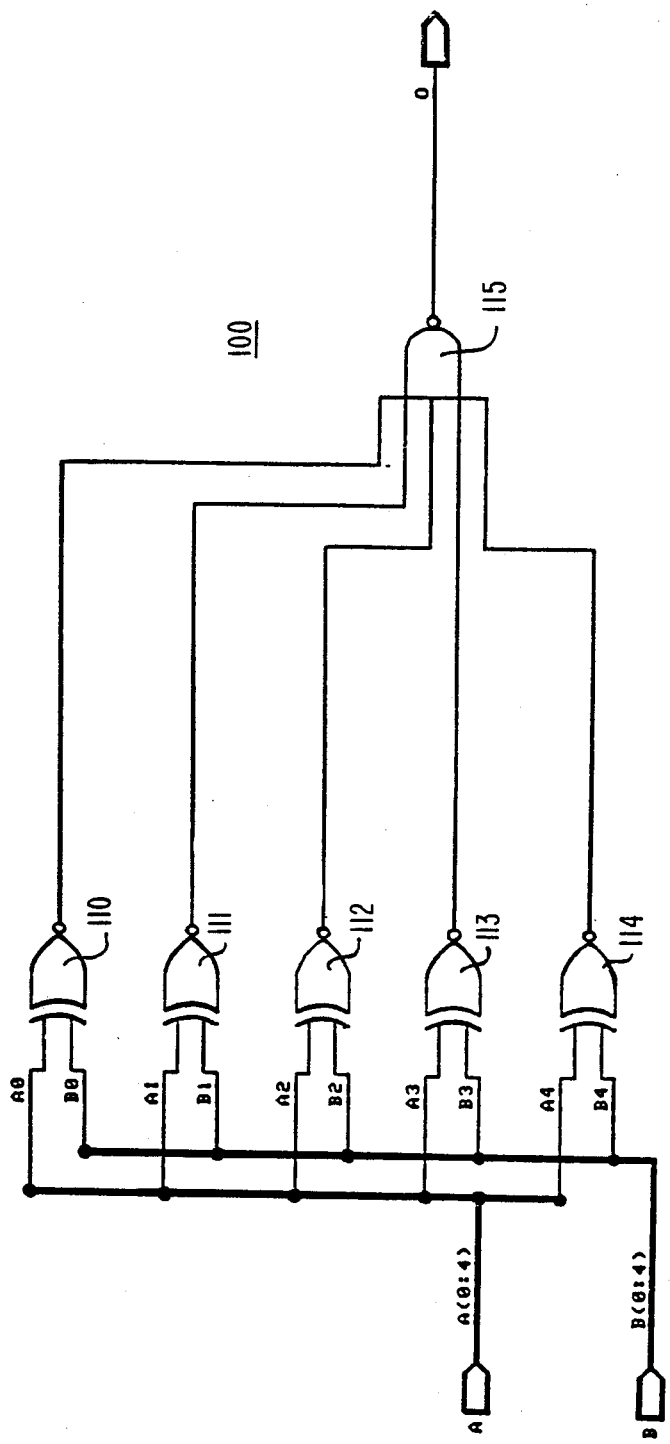
FIG. 15 is a logic diagram for the comparators of FIG. 14.

FIG. 15 is a logic diagram for comparator 101 and comparator 102 of FIG. 14. Comparator 101 and comparator 102 each comprise five exclusive OR gates, 110, 111, 112, 113, and 114 whose output signals are provided to NAND gate 115.

Figure 16:
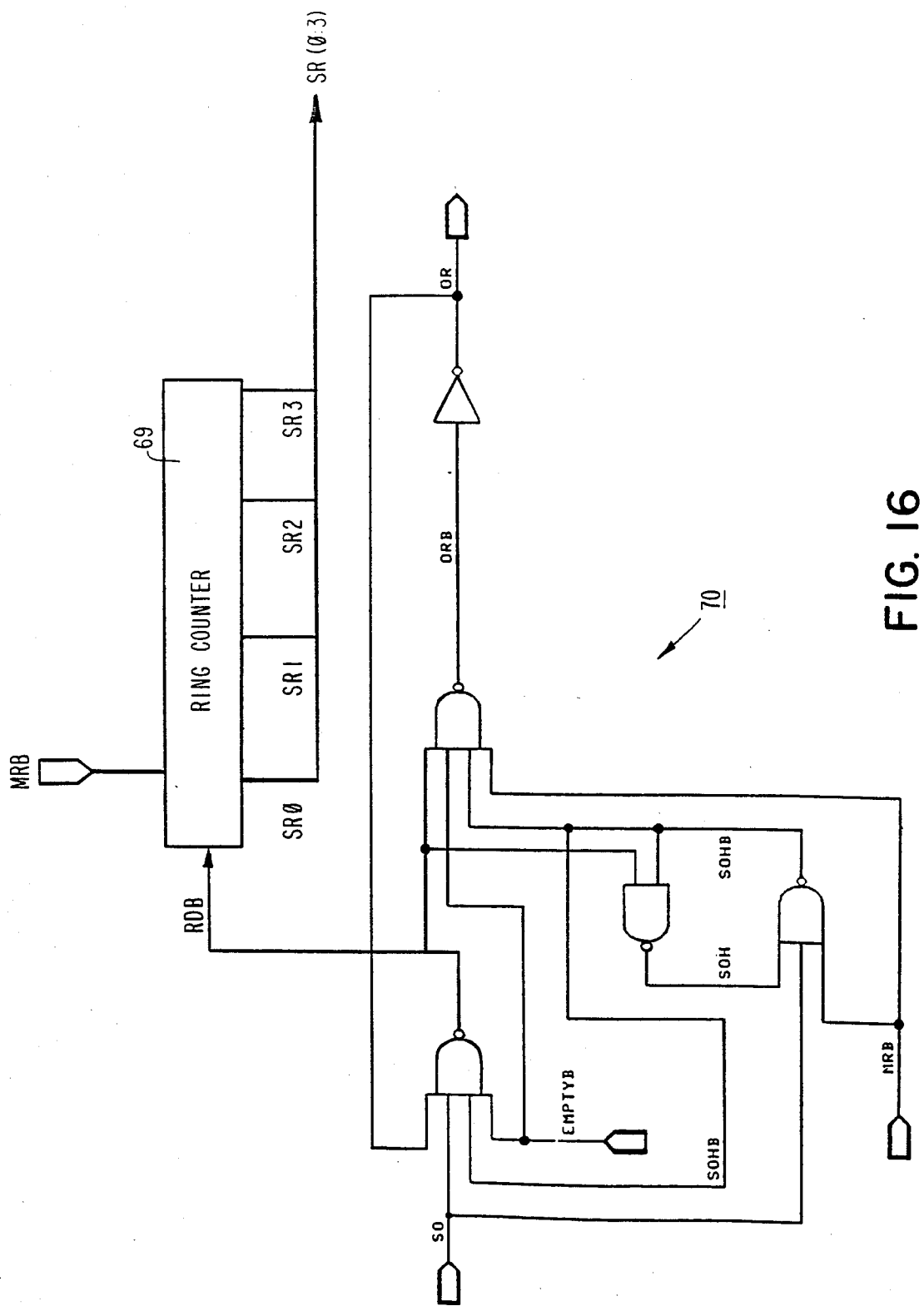
FIG. 16 is a logic diagram of output control logic 70 of FIG. 6.

FIG. 16 is a logic diagram of output control logic 70, which contains 4-bit ring counter 69. The input signals to output control logic 70 are the master reset bar signal on lead MRB, the empty bar signal on lead EMPTYB, segment read signals on leads SR0 through SR3 and the shift out signal on lead SO. The output ready signal appears on lead OR. Since the logic diagram of output buffer 70 is the same as input buffer 63 shown in FIG. 7 except for the labeling of the leads, it is not further explained here.

Figure 17:
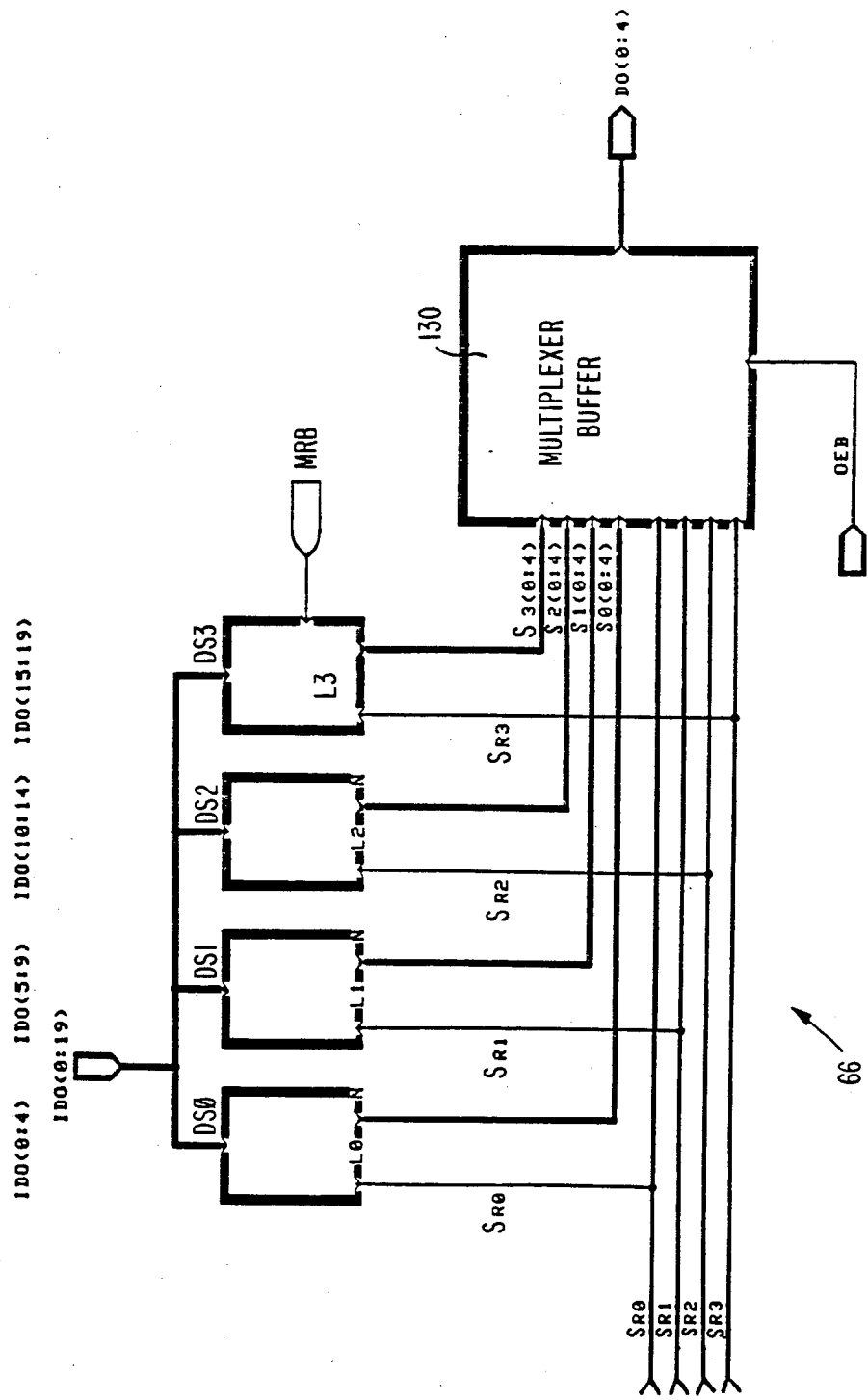
FIG. 17 is a block diagram of output buffer 66 of FIG. 6.

FIG. 17 shows a block diagram of output buffer 66. Output buffer 66 receives the data output signals IDO (0:19) from the correspondingly labeled output lead in FIG. 9. A word from segment S(k) (see FIG. 9) stored in output latch L(k), is presented to multiplexer buffer 130 on leads Sk(0:4) when the corresponding segment read signal SRk is high, for k=0, 1, 2, 3. The segment read signals SRk have the same timing relationship as shown for the segment write signals SWk, k=0, 1, 2, 3 shown in FIG. 8b. These low periods of the signals overlap. The effective read cycle for each Sk segment is extended as a result of the overlap of the low portions of the signals SRk.

FIG. 18 shows a block diagram of multiplexer buffer 130. Multiplex buffer 130 includes transmission gates T0-T3 and buffer 135. Signals SR0 through SR3 control circuits T0 through T3, respectively which together act as a 5 bit 4-to-1 multiplexer for signals S0 through S3. In this embodiment, the data output rate on line DO is increased by at least a factor of four over prior art pointer based rows.

While several embodiments of the invention have been described, the description is meant to be exemplary, and not limiting. It will be understood by one skilled in the art that various modifications and substitutions may be made therein without departing from the scope of the invention.

I claim:

1. A FIFO memory system comprising:
  a plurality of RAMs;
  means electrically coupled to said plurality of RAMs for writing a sequence of data words in a corresponding sequence of write time periods cyclically into said plurality of RAMS so that at least two of said write time periods overlap;
  means electrically coupled to said plurality of RAMs for reading a sequence of data words in a corresponding sequence of read time periods cyclically out of said plurality of RAMS so that at least two of said read time periods overlap;
  wherein said means for writing comprise:
    a plurality of storage elements for storing data;
    an input data buffer for receiving said sequence of data words and for providing said sequence of data words to said plurality of storage elements; and
    an input control logic circuit connected to said plurality of storage elements for causing said sequence of data words to be stored cyclically into said plurality of storage elements, each of said plurality of storage elements providing a word from said sequence stored therein to a RAM of said plurality of RAMs.

2. A FIFO memory system as in claim 1 wherein said input control logic circuit includes a ring counter for generating a plurality of write signals corresponding to said plurality of latches, each of said write signals having the same frequency and each being a linear translate of the other, each of said write signals being provided as the clock signal to one of said storage elements.

3. A FIFO memory system as in claim 1 wherein said means for writing cyclically includes a write ring pointer for directing a data word being written into a given RAM in said plurality of RAMs to a selected empty memory cell in said given RAM.

4. A FIFO memory system comprising:
  a plurality of RAMs;
  means electrically coupled to said plurality of RAMs for writing a sequence of data words in a corresponding sequence of write time periods cyclically into said plurality of RAMS so that at least two of said write time periods overlap;
  means electrically coupled to said plurality of RAMs for reading a sequence of data words in a corresponding sequence of read time periods cyclically out of said plurality of RAMS so that at least two of said read time periods overlap; and wherein said means for reading comprises:
  a plurality of storage elements for storing data;
  a multiplexer for receiving said sequence of data words;
  an output data buffer for receiving said sequence of data words from said multiplexer and for providing said sequences of said data words to external circuitry; and
  an output control logic circuit coupled to said plurality of storage elements and to said multiplexer for causing said sequence of data words to be stored cyclically into each of said plurality of storage elements, each of said plurality of storage elements providing a word from said sequence stored therein to a RAM of said plurality of RAMs.

5. A FIFO memory system as in claim 4, wherein said output control logic includes a ring counter for generating a plurality of read signals, each of said read signals having the same frequency and each being a linear translate of the other, each of said read signals being provided as the clock signal to said storage elements and as a control signal to said multiplexer.

* * * * *

UNITED STATES PATENT AND TRADEMARK OFFICE
CERTIFICATE OF CORRECTION

PATENT NO. : 4,862,419
DATED : August 29, 1989
INVENTOR(S) : Barry A. Hoberman

It is certified that error appears in the above-identified patent and that said Letters Patent is hereby corrected as shown below:

Front page, change "Assignee: Monolithic Memories, Inc., Santa Clara, Calif." to --Assignee: Advanced Micro Devices, Inc., Sunnyvale, Calif.--

Front page, after "Primary Examiner - Terrell W. Fears" add --Attorney, Agent or Firm: Nathan N. Kallman, Alan H. MacPherson, Paul J. Winters--

Front page, under References Cited, Patent No. 4,374,428 change "Barns" to --Barnes--

Column 9, line 63, change "D13" to --DI3--

Signed and Sealed this

Twenty-second Day of October, 1991

Attest:

HARRY F. MANBECK, JR.

*Attesting Officer*  *Commissioner of Patents and Trademarks*